Jan. 20, 1948.　　　J. A. CIVITARESE　　　2,434,834
LATHE ATTACHMENT
Filed Sept. 18, 1944　　　4 Sheets-Sheet 1
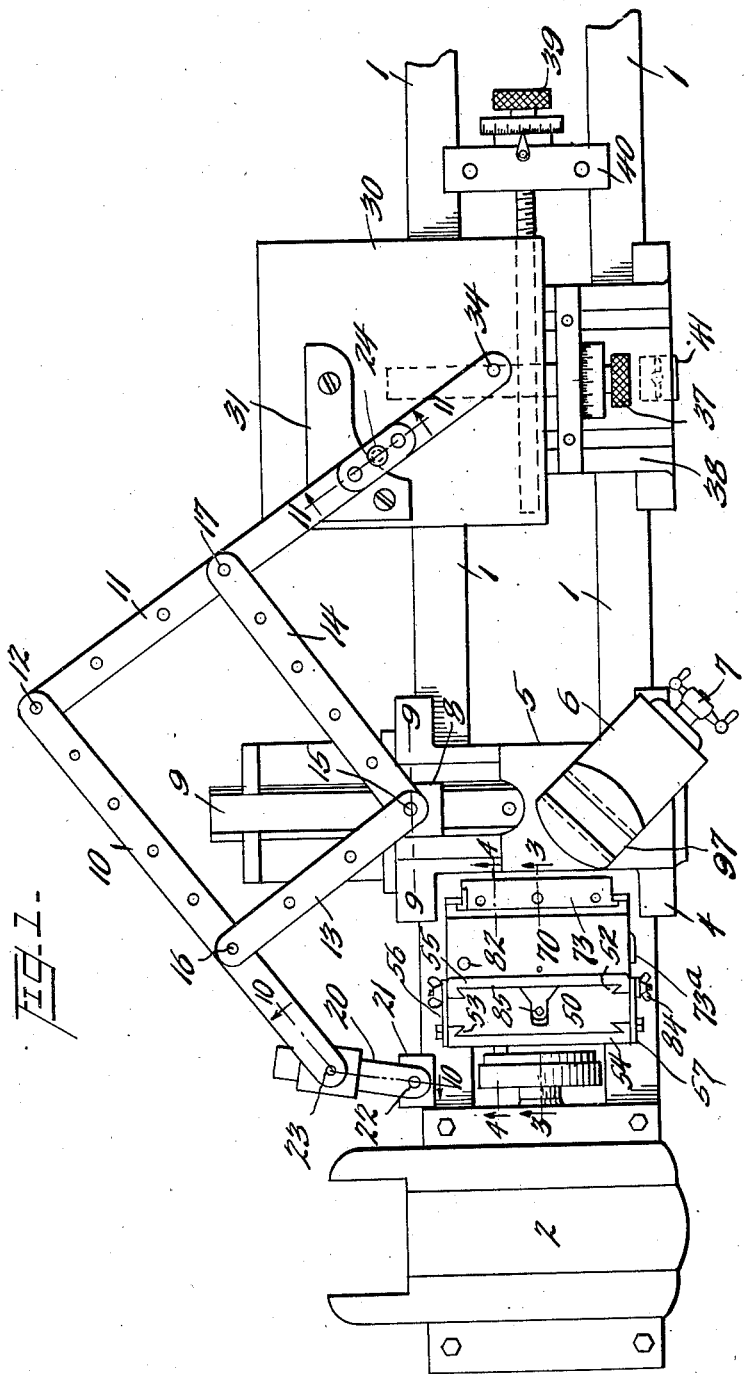
Inventor
Joseph A. Civitarese,
By
Attorneys

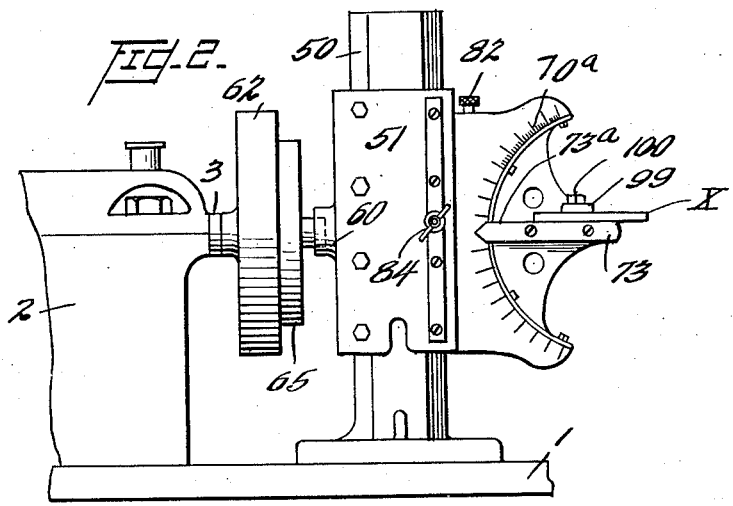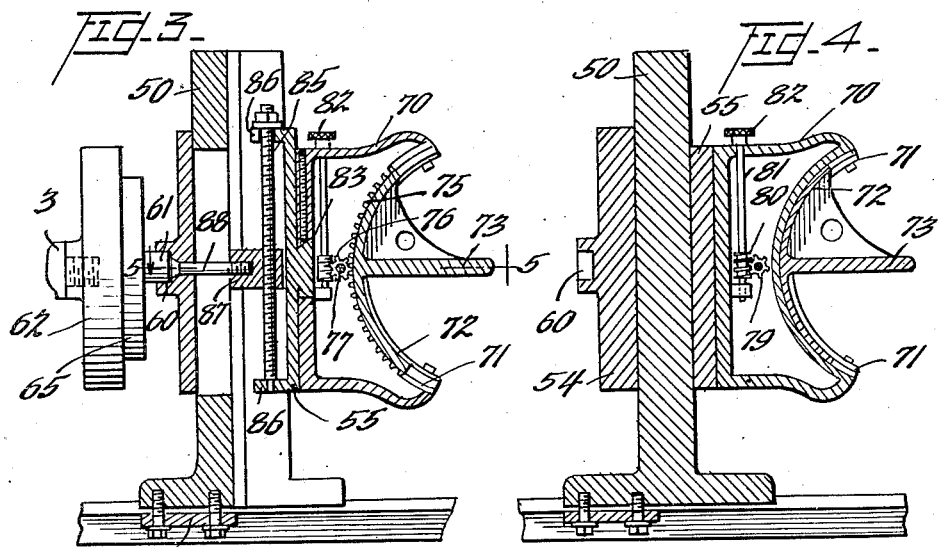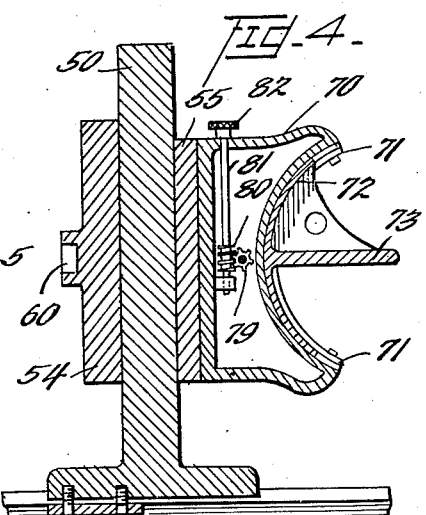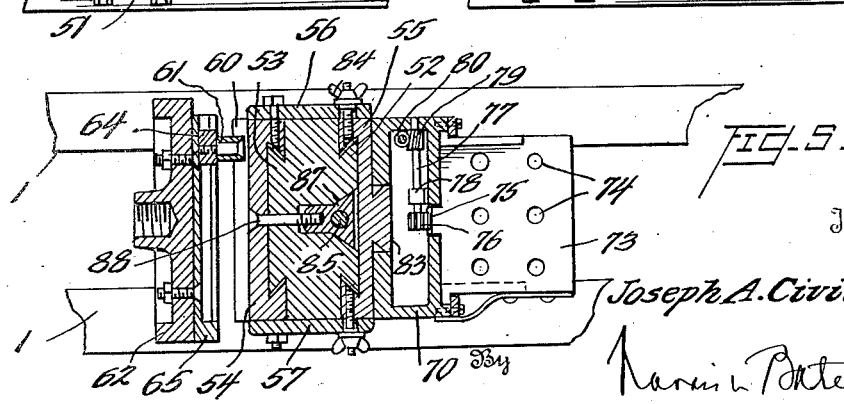

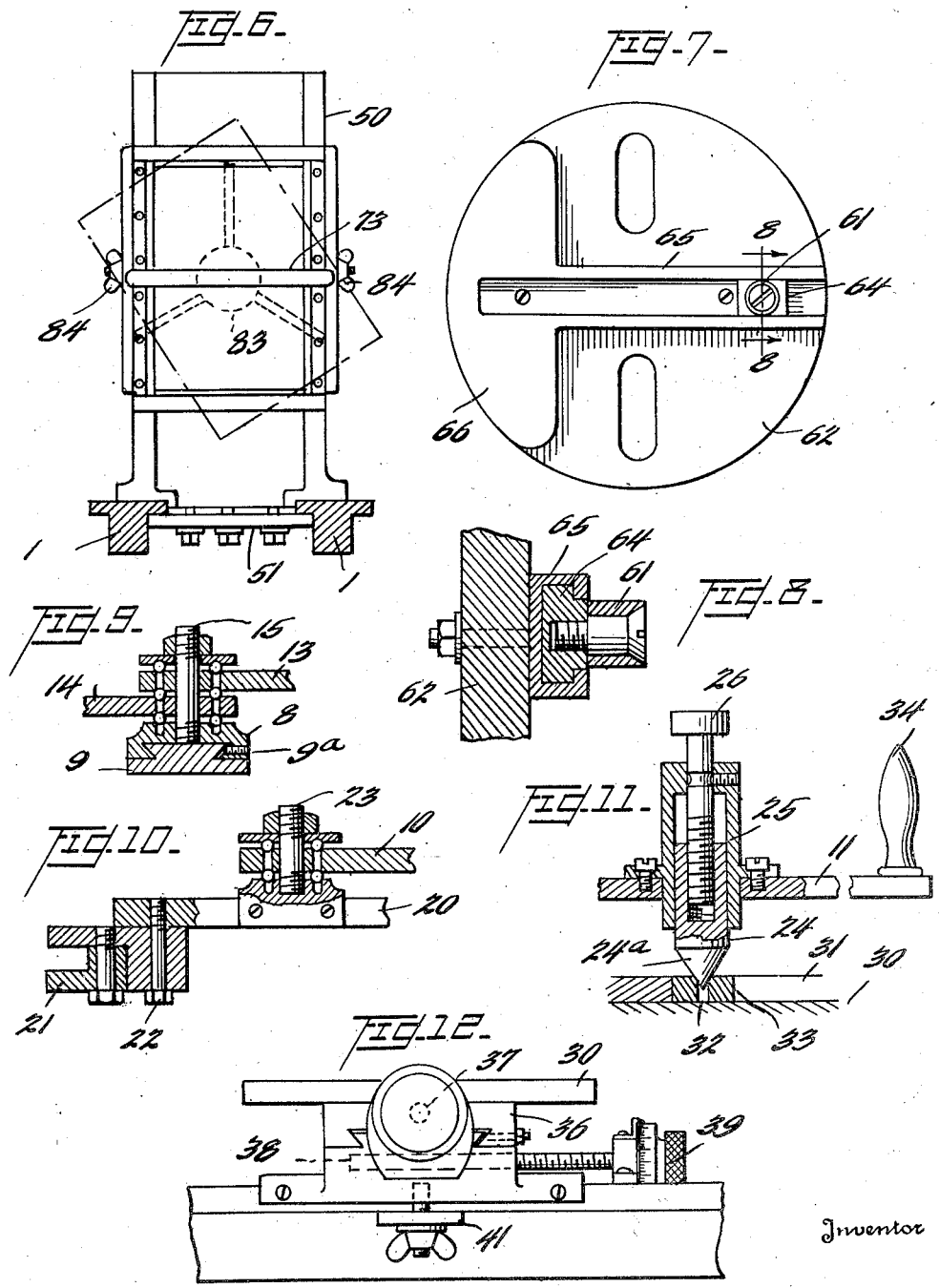

Jan. 20, 1948.　　J. A. CIVITARESE　　2,434,834
LATHE ATTACHMENT
Filed Sept. 18, 1944　　4 Sheets-Sheet 4
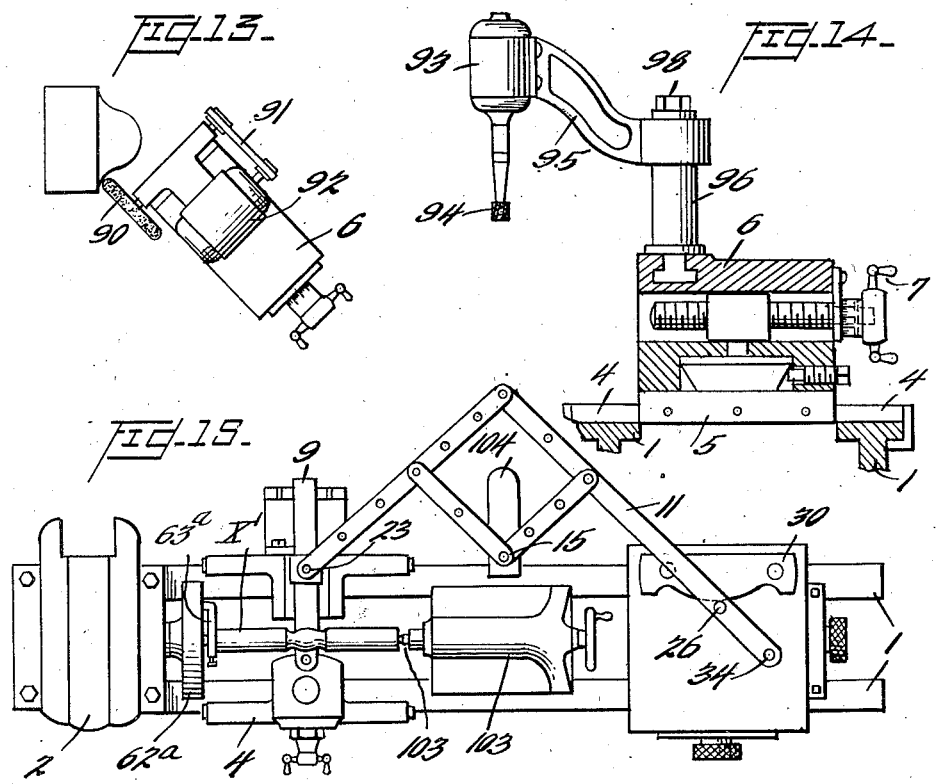
Inventor
Joseph A. Civitarese,
Attorneys Patented Jan. 20, 1948

2,434,834

UNITED STATES PATENT OFFICE 2,434,834

LATHE ATTACHMENT

Joseph A. Civitarese, Lodi, N. J.

Application September 18, 1944, Serial No. 554,665

19 Claims. (Cl. 51—100)

The present invention relates to attachments for lathes and similar machine tools, and more especially to attachments for shaping or grinding different desired contours on pieces of work.

The primary object of the invention is to provide an attachment of this class which may be readily applied to a lathe or similar machine tool, and which will reproduce on a piece of work the contour of a pattern or template.

The attachment comprises more particularly a pantograph adapted to be mounted on the bed of a lathe and connected to the tool carriage and slide; and to cooperate with a pattern or template having a contour corresponding with that desired to be produced on the piece of work, the pattern or template cooperating with the pantograph to control the movements of the tool carriage and slide of the lathe.

A further feature of the invention comprises a work holder which may be readily mounted on the bed of a lathe and having means operative by the lathe spindle for reciprocating a table on which the piece of work is held in a position for operation thereon of a tool in the tool holder of the lathe, the work table being adjustable angularly to suit the work to be done on the work piece.

To these and other ends, the invention consists in certain improvements and combinations and arrangements of parts, all as will be hereinafter more fully described, the features of novelty being pointed out more particularly in the claims at the end of this specification.

In the accompanying drawings:

Figure 1 is a top plan view of a lathe having an attachment according to the present invention mounted thereon.

Figure 2 is a side elevation, showing the work holder mounted on the lathe bed and cooperative with the lathe spindle for operation thereby.

Figure 3 is a vertical section taken centrally through the work holder on the line 3—3 in Fig. 1.

Figure 4 is a vertical section of the work holder taken on the line 4—4 in Fig. 1.

Figure 5 is a horizontal section through the work holder, taken on the line 5—5 in Fig. 3.

Figure 6 is an elevation of the work holder as viewed from the right in Fig. 2.

Figure 7 is an enlarged detail view in elevation of the lathe face plate provided with means for reciprocating the work holder.

Figure 8 is a detail section taken on the line 8—8 in Fig. 7.

Figures 9, 10 and 11 are enlarged, detail views of portions of the pantograph, taken on the lines 9—9, 10—10 and 11—11 respectively in Fig. 1.

Figure 12 is a front elevation of the pattern or template supporting table.

Figures 13 and 14 are a plan and an elevation respectively of grinders which may be employed.

Figure 15 is a top plan of a lathe showing another manner of mounting the pantograph, thereon.

Figure 16 is a detail view showing a different adjustment for the pantograph to adapt it to the size of the work to be operated upon.

Similar parts are designated by the same reference characters in the different figures.

The present invention is applicable generally to lathes, and to other similar machine tools having a spindle and a tool carriage and slide, it being shown in the present instance applied to a lathe of a conventional type having a bed comprising parallel longitudinal ways 1, a head stock 2 to receive power to drive the lathe and having the usual spindle 3 mounted therein, and a tool carriage 4 which is slidable longitudinally along the ways 1 and carries a compound tool feed comprising a cross slide 5 and a tool carrying slide 6 which is adjustable angularly on the slide 5 on a vertical axis, the tool mounted on the slide 6 being adjustable by the usual feed screw operated by the handle 7. However, in applying the attachment according to the present invention, the usual cross-feed screw for the cross-slide 5 is omitted or removed, and this slide is free to move transversely of the lathe bed and the carriage 4 is free to move longitudinally thereof under control of the attachment.

The tool controlling part of the attachment is a pantograph which comprises the pair of arms 10 and 11 which are pivotally connected at 12, and a pair of complemental links 13 and 14 which are pivotally connected at 15, these links being pivotally connected to the arms 10 and 11 respectively by the pivot bearings 16 and 17 which may be located at different points along said arms, as usual in pantographs, to enable the size or proportions of the reproductions obtained by the pantograph to be varied, as may be desired.

The arm 10 is pivotally connected to the lathe bed by a bracket 20 which, as shown in detail in Fig. 10, is provided with a clamp 21 for securing it to one of the ways of the lathe bed, the bracket being pivotally connected to the clamp by a screw 22 which may be tightened to secure the bracket 20 in different adjusted positions. The arm 20 is pivotally connected to the bracket 21 by a pivot 23.

The pivot 15 of the pantograph is attached to a slide 8 which is mounted adjustably on an extension 9 of the cross slide 5 and is secured in adjusted position along the extension by a clamping screw 9a, as shown in detail in Fig. 9, and the arm 11 of the pantograph carries a tracer pin 24 which as shown in Fig. 11, is preferably adjustable vertically in a socket 25 by an adjusting screw 26. The pivots 12, 15, 16, 17 and 23 of the pantograph are preferably in the form of antifriction bearings, such as these shown in Figs. 9 and 10.

In using the attachment, a table 30 is provided to support a pattern or template 31 for cooperation with the pantograph. The pin 24 of the pantograph which cooperates with the template preferably has a conical point 24a to engage in a central hole 32 in a cylindrical roller 33, the latter resting on and being slidable over the top surface of the table 30, and riding against the contour surface of the template, the pantograph arm 11 being provided with a handle 34 by means of which the pantograph is operated. The table 30 is preferably adjustable longitudinally and transversely of the lathe bed in order to bring the template thereon into proper relation with the piece of work to be operated upon, it being shown in Fig. 12 as mounted on a transverse slide 36 adapted to be adjusted by a screw 37, and the slide 36 being supported by a slide 38 which is adjustable longitudinally along the lathe bed by a screw 39 supported by a cross member 40 which is clamped to the ways of the bed. A screw clamp 41 is employed for securing the table immovably in adjusted position.

The work holder, which is shown in detail in Figs. 2 to 6 inclusive, comprises a standard or post 50 which is mounted on the lathe bed adjacent to the head stock and is securely clamped in fixed position thereon by a clamping plate 51. The standard is provided with gibs 52 and 53 on opposite vertical sides, these gibs receiving slides 54 and 55, and these slides are secured together by plates 56 and 57 which are bolted to the edges of the slides, these slides and plates thus forming a head which is slidable vertically on the standard. This sliding structure, which serves to reciprocate the work piece relatively to the tool on the tool carriage, is provided for this purpose with a horizontal channel 60, formed preferably on the outer face of the slide 54 to cooperate with a crank pin 61 on a face plate 62, the latter being secured to the lathe spindle 3 to be rotated thereby. Rotation of the face plate reciprocates the sliding head vertically on the standard, and in order to vary its range of reciprocation, the crank pin 61 is mounted in a block 64 which is adjustable along a diametral T-slotted channel member 65 secured to the face plate, such adjustment of the crank pin varying its distance from the center of the face plate, and thereby varying the range of reciprocation of the head on the standard. The member 65 is preferably provided, at its end opposite to its crank end, with a counterweight to counterbalance the crank pin and the sliding head.

The slide 55 of the reciprocating head carries the holder for the work piece, this holder comprising a bracket 70 which is mounted on the slide 55 and has an arcuate gib 71 to receive a corresponding arcuate segment 72 forming part of a table 73 which is adapted to hold the work piece while being operated upon, holes 74 or other suitable means being provided for clamping the work piece on the table. The table 73 is adjusted in the bracket by a gear segment 75 on the table with which a gear pinion 76 meshes, this pinion being fixed on a shaft 77 journaled in suitable bearings 78 in the bracket 70 and carrying a pinion 79 which meshes with a worm 80 on a vertical shaft 81, the latter extending through the top of the bracket 70 and being provided with an operating knob 82. A pointer 73a is preferably provided on the table 73 and arranged to cooperate with a scale 70a on the bracket 70 to indicate the angles of inclination in which the table 73 may be set. Operation of this knob will adjust the work holding table 73 so that it may be set in a horizontal position, or in different inclined positions longitudinally of the lathe bed, and it is also preferable to provide means for swivelling the bracket 70 on the head to enable the work table to be set at different inclinations transversely of the lathe bed, the bracket 70 being shown for this purpose with a central pivot 83 for pivotally mounting it on the slide 55 whereby it may be set in different angular positions, as indicated by the full and dotted lines in Fig. 6. It is also preferable to provide means for adjusting the height of the work table 73 relatively to the reciprocating head, the slide 55 carrying the bracket 70 being adjustable vertically relatively to the plates 56 and 57, and being securely clamped in different adjusted positions as by thumb screws 84, and the vertical adjustments of the slide 55 being effected by a screw 85 which is journaled at its ends in lugs 86 on the slide 55 and engages in a nut 87 secured by a screw 88 to the slide 54.

The cross-slide 6 is provided with a tool according to the nature of the operation to be performed on the piece of work on the work table. For example, in Fig. 13 the slide has a grinding wheel 90 mounted thereon, it being driven by a belt 91 from an electric motor 92, and in Fig. 14 an electric motor 93 having a grinding wheel 94 on its shaft is mounted on an arm 95 which is supported by a post 96, the slide 6 being formed with a T-slot 97 to receive the head of a bolt 98 which provides a pivot about which the grinder is adjustable, and which serves to clamp the grinder in different angular positions.

With the attachment set up on a lathe as shown in Figs. 1 to 12 inclusive, and the links 13 and 14 of the pantograph adjusted to reproduce on the work piece a contour of the desired size and proportion to that of the template 31 mounted on the table 30, the lathe spindle is rotated at a very slow speed, thereby rotating the crank pin 61 which imparts a vertically reciprocating movement to the work table 73 on which the piece of work X is clamped or otherwise held securely, as by a clamp 99 secured by a bolt 100, and while the piece of work is thus reciprocated, the roller 33 on the tracer pin 25 is caused to traverse the contour on the template 31 by manual operation of the handle 34. Movement of the roller 33 longitudinally of the template will cause the tool carriage to travel longitudinally on the lathe bed, and thereby cause the tool on the cross-slide 6 to feed toward and from the piece of work, and movement of the roller 33 transversely of the template will cause the cross-slide 5 to move transversely on the carriage, thereby moving the tool across the face of the piece of work, the resultant of these longitudinal and transverse movements of the tool reproducing on the work piece a contour corresponding with that on the template.

When the work piece is to be cut or ground at an incline, as for example, a cutting tool having a clearance angle, the work table 73 is adjusted to set the work piece at such an angle. In order to accommodate the attachment to work pieces of various sizes, the arm 20 of the pantograph may be swung into different angular positions about the bolt 22, or the arm 20 may be clamped to one or the other of the ways of the lathe bed, as shown in Figs. 1 and 16.

The pantograph attachment may also be employed for turning work pieces to contours corresponding to those of templates. Such an arrangement of the pantograph is shown in Fig. 15 in which the piece of work X' is placed between a center 101 on the face plate 62a and is driven therefrom by a dog 63a, the other end of the work piece being supported by the center 102 of the usual tail stock 103. In this arrangement, the middle pivot 15 of the pantograph is fixed to the lathe bed by a clamp 104, and the pivot 23 of the pantograph is connected to the extension 9 attached to the cross-slide 5. Operation of the handle 34 to cause the tracer roller 33 to follow the contour of the template on the table 30 while the piece of work is being rotated by the lathe spindle will cause the tool carriage and cross-slide to move correspondingly and thereby reproduce the contour of the template on the piece of work being turned.

A lathe attachment constructed and arranged as hereinbefore described enables work pieces to be formed by cutting or grinding to any desired shape according to templates, the attachment being particularly adapted for the production of form tools for use in lathes and other machine tools, it avoiding the inaccuracies of hand work and enabling any desired number of duplicate tools to be produced from the same template. Moreover, the pantograph enables contours to be produced on work pieces which are accurate reproductions of the contours of the templates, as the reproductions of the contours by the pantograph are of reduced size compared with those of the templates.

I claim as my invention:

1. An attachment for a lathe having a bed provided with longitudinal ways, a carriage freely movable longitudinally on the ways and mounted directly thereon, a cross slide mounted slidably on the carriage and freely movable thereon transversely of the bed, a tool slide carried by the cross slide and slidable in different angular directions thereon, a tool carried by the tool slide, a template support mounted directly on the ways of the lathe bed, means mounted on the bed for supporting a work-piece for operation of the tool thereon, and a pantograph having one pivot thereof supported on the lathe bed and another pivot thereof connected to the cross slide, and having a tracer to cooperate with a template on the template support.

2. An attachment according to claim 1, wherein said template support is adjustable longitudinally on and transversely of the ways of the lathe bed.

3. An attachment according to claim 1, including means for adjusting said template support longitudinally on and transversely of the ways of the lathe bed.

4. An attachment for a lathe having a bed, a work driving spindle, a carriage movable longitudinally of the bed, and a tool carrying slide mounted on the carriage and movable transversely of the bed, a work support mounted on the bed and movable vertically, means driven by the lathe spindle for reciprocating the work support, and a pantograph having one of its pivots connected to the lathe bed and another of its pivots connected to the tool carrying slide, and having a tracer to cooperate with a template on the template support.

5. An attachment according to claim 4, wherein said work support comprises a table having means for holding a work piece thereon, and adjustable into different angular positions relatively to its direction of reciprocation.

6. An attachment according to claim 4, wherein said work support comprises a table having means for holding a work piece thereon, and adjustable into different angular positions about an axis transverse to the lathe bed.

7. An attachment according to claim 4, wherein said work support comprises a table having means for holding a work piece thereon, and adjustable into different angular positions about an axis transverse to the length of the lathe bed, and including means for indicating the different angular adjustments of said table.

8. An attachment according to claim 4, wherein said work support comprises a table having means for holding a work piece thereon, and pivoted on an axis longitudinally of the lathe bed.

9. An attachment according to claim 4, wherein the first-mentioned pivot of the pantograph has means for attaching it to different portions of the lathe bed.

10. A work piece holder for a lathe having a bed and a spindle, comprising an upright standard having means for securing it on the bed adjacent to the spindle, a slide movable vertically on the standard and having means operative by the spindle for reciprocating it, and a table carried by the slide and having means for holding a piece of work thereon.

11. A work piece holder for a lathe having a bed and a spindle, comprising an upright standard having means for securing it on the bed adjacent to the spindle, a slide movable vertically on the standard and having means operative by the spindle for reciprocating it, and a table mounted on the slide for reciprocation therewith and adjustable into different angular positions relative to the horizontal, and having means for holding a piece of work thereon.

12. A work piece holder for a lathe having a bed and a spindle, comprising an upright standard having means for securing it on the bed adjacent to the spindle, a slide movable vertically on the standard and having means operative by the spindle for reciprocating it, a bracket carried by the slide and having an arcuate face, and a work-piece holding table having an arcuate face to cooperate rotatably with that of the bracket for adjusting the angular relation between the table and slide.

13. A work piece holder for a lathe having a bed and a spindle, comprising an upright standard having means for securing it on the bed adjacent to the spindle, a slide movable vertically on the standard and having means operative by the spindle for reciprocating it, a bracket carried by the slide and having an arcuate face, a workpiece holding table having an arcuate face to cooperate slidably with that of the bracket, and means carried by the bracket and cooperative with the table for adjusting the latter angularly relatively to the bracket.

14. A work piece holder for a lathe having a bed and a spindle, comprising an upright standard having means for securing it in fixed position on the bed opposite to the spindle, a slide movable vertically on the standard and having means operative by the spindle for reciprocating it, a bracket carried by the slide and having an arcuate face, a work-piece holding table having an arcuate face to cooperate slidably with that of the bracket, means carried by the bracket and cooperative with the table for adjusting the latter angularly relatively to the bracket, and a pointer on the table and a cooperative scale on the bracket for indicating different angular adjustments of the table.

15. A work-piece holder for a lathe having a bed and a spindle, comprising a standard having means for securing it in fixed position on the bed opposite to an end of the spindle, a slide movable vertically on the standard and having means operative by the spindle for reciprocating it, a bracket pivoted on the slide for adjustment about a horizontal axis longitudinal to the lathe bed, and a work-piece holding table mounted on the bracket for adjustment about a horizontal axis transverse to the lathe bed.

16. A work-piece holder for a lathe having a bed and a spindle, comprising a standard having means for securing it in fixed position on the bed opposite to an end of the spindle, a slide movable vertically on the standard and including one member having means for reciprocating it by the lathe spindle and having a second member adjustable vertically relative to the first-mentioned member, and a work-piece holding table carried by said second member.

17. A work-piece holder for a lathe having a bed and a spindle, comprising a standard having means for securing it in fixed position on the bed opposite to an end of the spindle, a slide movable vertically on the standard and having a horizontally extending channel thereon, a work-piece holding table carried by said slide, and a crank pin operative by the lathe spindle and cooperative with said channel for reciprocating the slide.

18. A work-piece holder for a lathe having a bed and a spindle, comprising a standard having means for securing it in fixed position on the bed opposite to an end of the spindle, a slide movable vertically on the standard and having a horizontally extending channel thereon, a work-piece holding table carried by the slide, a face plate rotatable by the lathe spindle and carrying a crank pin which is adjustable radially thereof and cooperative with the channel on the slide for reciprocating it.

19. An attachment for a lathe having a pair of longitudinal ways, a carriage freely slidable directly on the ways, a cross slide slidable transversely on the carriage, a tool carried by the cross slide, and means for supporting a work piece for operation thereon by the tool, said attachment comprising a pantograph having means for pivotally mounting it on the lathe, means for supporting directly on the ways a template having a contour for tracing by the pantograph, and means for connecting the pantograph to the carriage and cross slide for moving the carriage longitudinally on the ways and the cross slide transversely on the carriage in accordance with the contour of the template traced by the pantograph.

JOSEPH A. CIVITARESE.

REFERENCES CITED

The following references are of record in the file of this patent:

UNITED STATES PATENTS

| Number | Name | Date |
| --- | --- | --- |
| 2,038,455 | Studer | Apr. 21, 1936 |
| 2,333,985 | Clark | Nov. 9, 1943 |
| 2,360,772 | Hedin | Oct. 17, 1944 |
| 1,234,225 | Sickles | July 24, 1917 |
| 2,379,419 | Atti | July 3, 1945 |
| 2,179,211 | Flygare | Nov. 7, 1939 |